United States Patent
Douma et al.

(10) Patent No.: US 7,458,291 B2
(45) Date of Patent: Dec. 2, 2008

(54) SELF-SEALING YOKE ASSEMBLY FOR A STEERING APPARATUS

(75) Inventors: John D. Douma, Beverly Hills, MI (US); John F. Laidlaw, Dearborn, MI (US); Madhu Nambiar, Canton, MI (US)

(73) Assignee: Ford Motor Company, Dearborn, MI (US)

(*) Notice: Subject to any disclaimer, the term of this patent is extended or adjusted under 35 U.S.C. 154(b) by 194 days.

(21) Appl. No.: 11/656,185

(22) Filed: Jan. 22, 2007

(65) Prior Publication Data

US 2008/0006111 A1 Jan. 10, 2008

Related U.S. Application Data

(63) Continuation-in-part of application No. 11/482,143, filed on Jul. 6, 2006.

(51) Int. Cl.
*F16H 35/00* (2006.01)
(52) U.S. Cl. .................. 74/388 PS; 74/409; 277/312; 277/549
(58) Field of Classification Search ............ 74/388 PS, 74/422, 89.11, 109; 277/309, 349, 351, 402, 277/549, 312
See application file for complete search history.

(56) References Cited

U.S. PATENT DOCUMENTS

| | | | | |
|---|---|---|---|---|
| 6,076,417 A * | 6/2000 | Engler | ..................... | 74/388 PS |
| 6,357,314 B1 * | 3/2002 | Sommer | ................. | 74/388 PS |
| 6,591,706 B2 | 7/2003 | Harer et al. | | |
| 6,619,420 B1 | 9/2003 | Saarinen | | |
| 6,736,021 B2 * | 5/2004 | Adams et al. | ............ | 74/388 PS |
| 7,281,444 B1 * | 10/2007 | Bishop | .................... | 74/388 PS |
| 2004/0036226 A1 * | 2/2004 | Hosoda et al. | .............. | 277/345 |
| 2007/0209464 A1 * | 9/2007 | Roline et al. | .................. | 74/422 |
| 2008/0034910 A1 * | 2/2008 | Roline et al. | .................. | 74/422 |
| 2008/0078263 A1 * | 4/2008 | Pattok | .................... | 74/388 PS |

* cited by examiner

*Primary Examiner*—David M Fenstermacher

(57) ABSTRACT

A rack and pinion steering system including a rack slidably supported within a housing that engages in a pinion gear wherein the housing includes a cylindrical sleeve having an outer seal surface with a slight medial taper at one end thereof. A yoke assembly, which is received by the cylindrical sleeve, operates to guide the rack and maintain engagement of the rack and pinion during operation of the steering system and includes a yoke member engaging the rack. A retainer member holds a yoke plug, used in the yoke assembly, in position and has a compliant annular seal member having an inner sealing surface that has a complementary slight outward extending taper to provide a self-sealing interface with the medial taper of the outer seal surface of the cylindrical sleeve to protect the internal components of the steering system from water and other contaminants.

13 Claims, 2 Drawing Sheets

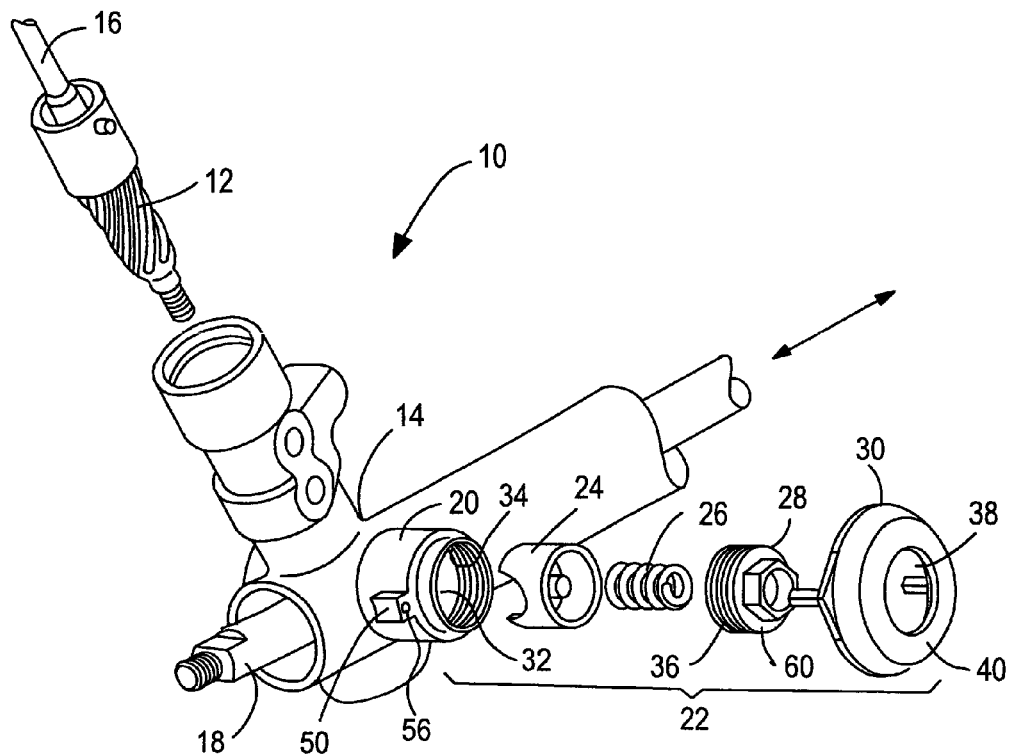
FIG. 1
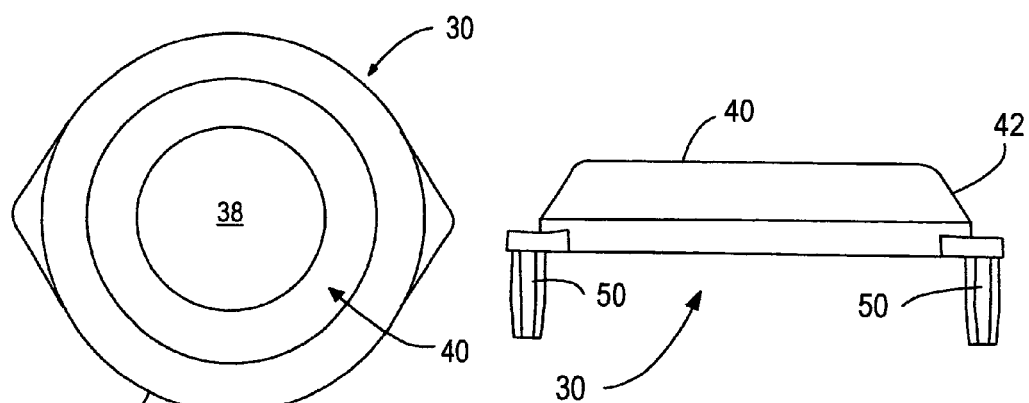
FIG. 2
FIG. 3

SELF-SEALING YOKE ASSEMBLY FOR A STEERING APPARATUS

CROSS-REFERENCE TO RELATED APPLICATIONS

This application is a continuation in part of a previous application, entitled "Yoke Assembly For A Power Steering Apparatus," having Ser. No. 11/482,143 and filed Jul. 6, 2006.

BACKGROUND OF THE INVENTION

1. Field of the Invention

The present invention relates generally to a rack and pinion steering assembly; and more specifically, to a self-sealing yoke assembly for supporting the rack and pinion of the steering assembly.

2. Description of Related Art

Modern automotive vehicle steering assemblies typically use a rack and pinion gear system that translates the rotational movement of the steering wheel into linear movement needed to turn the vehicle wheels. In general, a housing encloses a rack and pinion gear set. A steering shaft attaches to the pinion gear such that rotation of the steering wheel turns the pinion gear that correspondingly moves the rack. Tie rods connect the rack to the vehicle wheels such that movement of the rack turns the wheels. Most automotive vehicles utilize a power assisted rack and pinion steering system. Part of the power-assisted steering system assembly includes a cylinder with a piston in the middle wherein the piston connects to the rack. There are two fluid ports one on either side of the piston. Supplying higher-pressure fluid to one side of the piston forces the piston to move which in turn moves the rack. A rotary valve, typically attached to the steering shaft, supplies and meters pressurized fluid to the fluid ports to assist the vehicle operator when exerting force on the steering wheel.

In order to maintain engagement between the teeth of the pinion gear and those of the rack, such steering systems typically employ or utilize a yoke assembly to support the rack and pinion gear set. The yoke assembly typically includes a yoke, a yoke spring, a threaded yoke plug and a retention feature. The yoke transmits a load from the yoke spring to the rack to maintain engagement between the rack and pinion. The opposite end of the yoke spring contacts the yoke plug that threadably engages the housing. The yoke plug is set mechanically to ensure contact between the rack and pinion teeth. Once set, the retention feature locks the yoke plug in place.

Rack grease, which fills the rack and pinion housing cavity, seals the yoke/yoke plug assembly from the outside environment. The steering gear environment is very harsh and is subject to water, debris and other contamination. Over time, the water or other contaminants make their way to the rack and pinion housing through the yoke plug threads and rack grease causing corrosion of the steering assembly components. The corrosion typically results in excessive axial lash in the tie rods causing steering play along with noise, vibration and harshness issues. Corrosion may also cause damage to the steering assembly system seals resulting in power steering fluid loss and eventual loss of the power steering function. One known design that provides such a sealed interface includes a separate seal member between the rack and pinion housing and the yoke plug. However, this separate seal member adds costs, both production and component, to the rack and pinion steering system.

Thus, it is desirable to have a sealed yoke assembly without requiring additional components to provide the seal so as to reduce the final cost of the yoke assembly and yet provide a robustly sealed interface to protect steering gear internal components from water and other contaminants.

SUMMARY OF THE INVENTION

Accordingly, the present invention is a rack and pinion steering system including a housing with a cylindrical sleeve wherein the cylindrical sleeve has a seal surface at one end thereof with a slight medial taper. The steering system further includes a rack slidably supported within the housing that engages a pinion gear also supported in the housing. A yoke assembly that operates to guide the rack and maintain engagement of the teeth of the rack and pinion during operation of the steering system is received by the cylindrical sleeve and includes a yoke member engaging the rack. A biasing member located between the yoke member and a yoke plug presses the yoke member against the rack.. A retainer member holds the yoke plug in position and has a compliant flange, or annular seal member, that has an inner seal surface having a slight outwardly extending taper to provide a self-sealing interface with the seal surface of the cylindrical sleeve so as to protect the internal components of the steering system from water and other contaminants.

BRIEF DESCRIPTION OF THE DRAWINGS

FIG. 1 is an exploded perspective view of the rack and pinion steering system including a yoke apparatus according to the embodiment of the present invention;

FIG. 2 is a front view of a retainer member of the yoke apparatus according to the embodiment of the present invention;

FIG. 3 is a side view of the retainer member of FIG. 2 taken along section B-B;

DETAILED DESCRIPTION OF THE PREFERRED EMBODIMENTS

Figure 4:
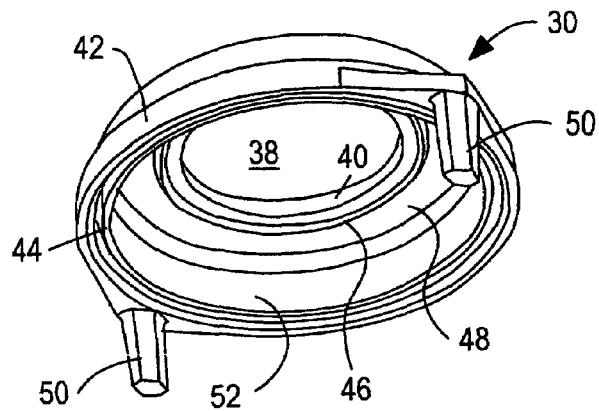
FIG. 4 is a perspective view of the retainer member of FIG. 2.
Figure 6:
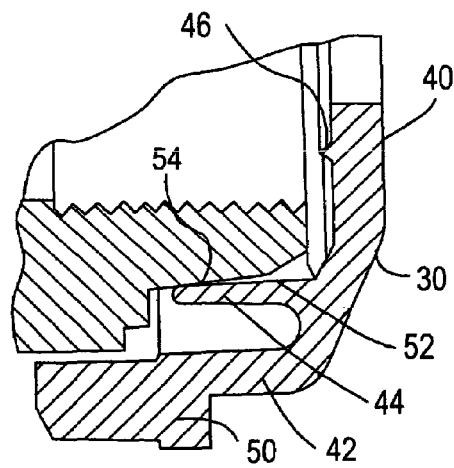
FIG. 6 is a cross-section view of the sealing surface of the rack and pinion housing and the retaining member of the preferred embodiment of the present invention.

FIG. 1 shows a perspective view of a rack and pinion steering system, seen generally at 10, according to one embodiment of the present invention. The rack and pinion steering system 10 includes a pinion gear 12 rotatably supported in a housing 14. A pinion shaft 16 attaches the pinion gear 12 to a steering wheel (not shown). A rack 18 supported in the housing 14 connects to the steering wheels (not shown). The rack 18 meshes with the pinion gear 12 such that rotational movement of the steering wheel turns the vehicle wheels in a manner well known in the art.

The housing 14 further includes a cylindrical sleeve 20 formed on the one side of the housing 14 in a direction perpendicular to the rack 18. A yoke assembly 22, located in the cylindrical sleeve 20, supports and maintains engagement of the rack 18 with the pinion gear 12. The yoke assembly 22 includes a yoke member 24, a biasing member or compression spring 26, a yoke plug 28 and a retainer member 30. A central passageway 32 of the cylindrical sleeve 20 slidably receives the yoke member 24. The cylindrical sleeve 20 further includes a threaded portion 34 that receives complementary threads 36 on the yoke plug 28. The biasing member or compression spring 26 is located in the passageway 32 between the yoke member 24 and the yoke plug 28 whereby the force of the biasing member or compression spring 26 pushes the yoke member 24 against the rack 18 to maintain engagement between the rack 18 and the pinion gear 12.

Accordingly, once the yoke assembly 22, specifically the yoke member 24, biasing member 26 and yoke plug 28, are positioned in the cylindrical sleeve 20, the yoke plug 28 is rotated to compress the biasing member 26 and provide a predetermined or preloaded force on the rack 18 through the yoke member 24. Upon reaching the predetermined or preloaded force the retainer member 30, as set forth more fully below, fixes the position of the yoke plug 28.

FIGS. 2-6 illustrate the present invention wherein the retainer member 30 has a generally cylindrical cup shape and fits over the cylindrical sleeve 20 housing the yoke assembly 22. The retainer member 30 includes a center aperture 38 formed in the planar base portion 40. An annular sidewall 42 extends from the base portion 40. A flange in the form of an annular seal member 44 is connected to and extends from the base portion 40 and spaced radially from the annular sidewall 42. The seal member 44 includes an inner seal surface 52 that is tapered outwardly slightly to engage a complementary radial outer sealing surface 54 located at an end of the cylindrical sleeve 20. In one embodiment, the outer sealing surface 54 is tapered inwardly at a slightly larger angle than the taper of inner seal surface 52. For example, the inner seal surface 52 is angled outwardly at a 2 degree angle while the outer sealing surface 54 is angled inwardly at a 5 degree angle. In another embodiment, the outer sealing surface 54 is tapered inwardly at an angle equal to the tapered angle of the inner seal surface 52. In both embodiments, however, the angle of the tapers is relatively small, for example, ranging from 0 to 15 degrees.

Figure 5:
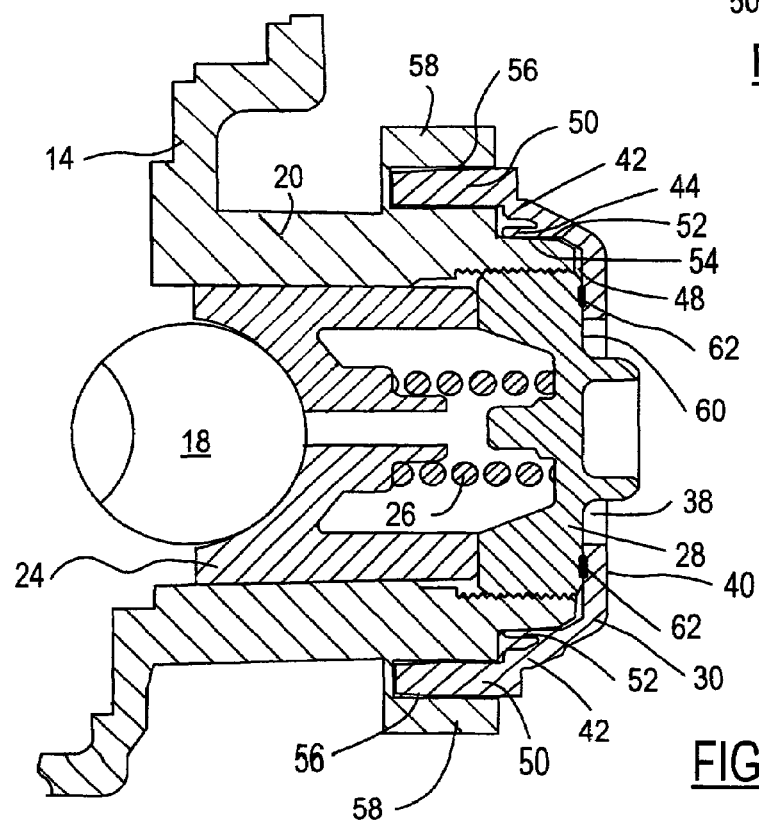
FIG. 5 is a section view of the yoke apparatus according to a preferred embodiment of the present invention.

A pair of anti-rotation tabs 50 is located on the circumference of the annular sidewall 42. As illustrated in FIG. 5, the anti-rotation tabs 50 slide into apertures 56 located in ear portions 58 formed on or adjacent to the cylindrical sleeve 20.

Accordingly, the yoke assembly 22 including the yoke plug 28 is set within the cylindrical sleeve 20 in the conventional way. While in the preferred embodiment, both the yoke plug 28 and the retainer member 30 are formed of a plastic material, other material can also be used. Upon setting the yoke plug 28, the retaining member 30 is installed such that the anti-rotation tabs 50 are slidably received in the apertures 56. As illustrated, the tapered inner seal surface 52 of the annular member 44 compliantly engages the tapered outer seal surface 54 of the cylindrical sleeve 20 thereby forming a seal between the retaining member 30 and the cylindrical sleeve 20 without any added components or production steps.

As illustrated in FIG. 5, the interior or engagement surface 48 of the retainer member 30 then contacts the upper or top face 60 of the yoke plug 28. An ultrasonic welding process welds and thereby secures the retaining member 30 to the yoke plug 28. Accordingly, the ultrasonic welding fuses the retainer member 30 to the yoke plug 28 and forms a permanent connection, illustrated as the annular weld 62. The weld 62 is circular, is spaced from and extends about the circumference of the center aperture 38.

In the preferred embodiment, an annular bead 46 is formed on the interior or engagement surface 48 and adjacent the center aperture 38 of the base portion 40. The annular bead 46 engages the top or outer surface 60 of the yoke plug 28 to ensure a good weld at the interface or junction between the retaining member 30 and yoke plug 28. Welding the retaining member 30 to the yoke plug 28 enables the anti-rotation tabs 50, located in the apertures 56, to prevent movement of the yoke plug 28 and correspondingly maintain the yoke plug 28 at the set position.

As disclosed, the retaining member 30 is sealed to the cylindrical sleeve 20 of the housing 14 through use of cooperating tapers. The tapered sealing surface 52 of the annular seal member 44 engages the tapered radial seal surface 54 of the sleeve 20 to seal the retainer member 30 to the cylindrical sleeve 20 and thus to the housing 14. Accordingly, potential leak paths are completely sealed to provide a robust joint.

While ultrasonic welding is contemplated as the preferred method to fasten and correspondingly seal the retaining member 30 and the plug 28, other fastening or connection methods that bond the two parts together such as adhesives or other welding means besides sonic welding is contemplated and may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rack and pinion steering system comprising:
   a housing having a cylindrical sleeve, the cylindrical sleeve having an outer seal surface at one end thereof, the outer seal surface having a slight medial taper;
   a rack slidably supported within said housing;
   a pinion gear supported on said housing and engaging said rack; and
   a yoke assembly slidably received by said cylindrical sleeve, the yoke assembly including a yoke member engaging said rack, a yoke plug, a biasing member positioned between said yoke member and said yoke plug, and a retainer member engaging said yoke plug and said cylindrical sleeve, said retainer member having a compliant annular seal member including an inner sealing surface having a slight outwardly extending taper for providing a self-seal against the complimentary slight medial taper of said outer seal surface of said cylindrical sleeve.

2. A rack and pinion steering system as set forth in claim 1 wherein said taper of said inner sealing surface and said taper of said outer seal surface are both tapered at relatively small angles.

3. A rack and pinion steering system as set forth in claim 1 wherein said slight medial taper of said outer seal surface of said cylindrical sleeve is slightly larger than the complimentary slight outwardly extending taper of said inner sealing surface of said annular seal member of said retaining member.

4. A rack and pinion steering system as set forth in claim 1 wherein said slight medial taper of said outer seal surface of said cylindrical sleeve is equivalent to said complimentary slight outwardly extending taper of said inner sealing surface of said annular seal member of said retaining member.

5. A rack and pinion steering system as set forth in claim 2 wherein each of said angles of said tapers range from 0 to 15 degrees.

6. A rack and pinion steering system as set forth in claim 1 wherein said retainer member is ultrasonically welded to said yoke plug.

7. A rack and pinion steering system as set forth in claim 1 wherein said retainer member further includes an anti-rotation member, said anti-rotation member engaging said housing and maintaining a positional relationship between said retainer member and said yoke plug.

8. A rack and pinion steering system comprising:

a housing having a cylindrical sleeve, the cylindrical sleeve having an outer seal surface at one end thereof, the outer seal surface having a slight medial taper;

a rack slidably supported within said housing;

a pinion gear supported on said housing and engaging said rack;

a yoke assembly slidably received by said cylindrical sleeve, the yoke assembly including a yoke member engaging said rack, a yoke plug, a biasing member positioned between said yoke member and said yoke plug, and a retainer member engaging said yoke plug and said cylindrical sleeve, said retainer member having a compliant annular seal member including an inner sealing surface having a slight outwardly extending taper for providing a self-seal against the complimentary slight medial taper of said outer seal surface of said cylindrical sleeve, wherein each of said tapers are angled at relatively small angles.

9. A rack and pinion steering system as set forth in claim 8 wherein each of said angles of said tapers range from 0 to 15 degrees.

10. A rack and pinion steering system as set forth in claim 8 wherein said angle of said taper of said outer seal surface is larger than the angle of said taper of said inner sealing surface of said annular seal of said retainer member.

11. A rack and pinion steering system as set forth in claim 8 wherein said angle of said outer seal surface taper of said cylindrical sleeve is equivalent to said angle of said inner sealing surface taper of said annular seal member of said retaining member.

12. A rack and pinion steering system as set forth in claim 8 wherein said retainer member is ultrasonically welded to said yoke plug.

13. A rack and pinion steering system as set forth in claim 8 wherein said retainer member further includes an anti-rotation member, said anti-rotation member engaging said housing and maintaining a positional relationship between said retainer member and said yoke plug.

* * * * *